United States Patent

[11] 3,633,596

[72] Inventor Robert L. Gerber
        Ridgecrest, Calif.
[21] Appl. No. 57,710
[22] Filed July 23, 1970
[45] Patented Jan. 11, 1972
[73] Assignee The United States of America as
        represented by the Secretary of the Navy

[54] DIAPHRAGM VALVE
     3 Claims, 1 Drawing Fig.
[52] U.S. Cl............................................. 137/68,
                                                      222/5
[51] Int. Cl.....................................F16k 13/04,
                                                   B67b 7/24
[50] Field of Search............................ 220/89 A,
                              47; 222/5, 83; 137/68–71

[56] References Cited
     UNITED STATES PATENTS
2,120,248   6/1938   Hinchman..................   222/5

3,266,669   8/1966   Vuyosevich.................   222/5
2,441,011   5/1948   Dodelin......................   222/5
3,145,573   8/1964   Hebenstreit................   222/5 X

*Primary Examiner*—M. Cary Nelson
*Assistant Examiner*—Richard Gerard
*Attorneys*—R. S. Sciascia and Thomas O. Watson, Jr.

ABSTRACT: A diaphragm valve for sealing a chamber which consists of a rupture disc, a hollow knife, a power spring, a power spring retainer and a bellows motor. The hollow knife is positioned by the power spring retainer adjacent to the rupture disc. A bellows motor, suitably positioned at the head end of the knife, provides the force, when initiated, to force the knife into the disc to rupture it thus permitting air to fill the chamber through the hollow knife body. The device may also be activated manually with the power spring providing the driving force to the knife.

PATENTED JAN 11 1972
3,633,596
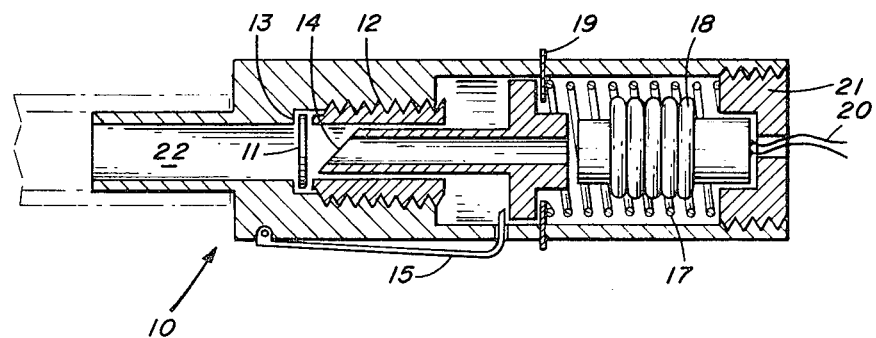
INVENTOR.
ROBERT L. GERBER
BY Thomas O. Watson Jr.
ATTORNEY

DIAPHRAGM VALVE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates generally to diaphragm valves and more particularly to such valves that may be either electrically or manually activated to provide a fluid passage way into a sealed pressure or vacuum chamber.

Emergency cockpit illumination, in the case of a power failure, is of interest to all aircraft pilots and their passengers. The chemiluminescent method of emergency cockpit lighting has been found to be superior to other methods of emergency lighting because there are no batteries or other devices which deteriorate with time. Such deterioration frequently leaves the device inoperative at the time that it is most needed. A typical chemiluminescent lighting system is shown in U.S. Pat. No. 3,354,828 for CHEMILUMINESCENT EMERGENCY LIGHT issued Nov. 28, 1967.

SUMMARY OF THE INVENTION

The device of the present invention is used to seal and to activate on command an emergency chemiluminescent light. This is accomplished by deforming an aluminum rupture disc to create a positive seal. A hollow knife is positioned adjacent the rupture disc and is held in place by a knife retainer. Both a manual and electrical energy source are provided to drive the knife into the rupture disc. Activation through either of these sources causes the knife to move forward through the rupture disc thereby providing a fluid passageway to the sealed chamber through the hollow knife body. While the device has been found to be particularly suitable for sealing and activating chemiluminescent light sources, it is contemplated that the diaphragm valve of the present invention may be applied in any situation requiring both a sealing and seal-rupturing mechanism.

OBJECTS OF THE INVENTION

Accordingly, it is an object of the present invention to provide a valve capable of sealing a pressure or vacuum chamber for long periods of time.

Another object is to provide a valve that may be activated to open a sealed fluid passageway.

A further object of the invention is the provision of a valve that may be either electrically or manually operated.

These and other objects and advantages as well as the exact nature of this invention will be readily apparent from consideration of the following specification relating to the annexed drawing in which the figure is a cutaway showing a preferred embodiment of the invention.

DETAILED DESCRIPTION OF THE PREFERRED EMBODIMENT

The figure, which illustrates a preferred embodiment of the present invention, shows a valve body 10 having an internal chamber. Positioned within the valve body 10 and adjacent an internal shoulder 13 thereof, is a rupture disc 11. A rupture disc positioner 12 is threadably engaged within the internal chamber of the valve body 10. A positive seal is established at the rupture disc 11 by deforming it between the internal shoulder 13 and the rupture disc positioner 12. The rupture disc 11 may be made of soft aluminum or any other suitable material.

Positioned adjacent the rupture disc 11 is a hollow knife member 14. A knife retainer 15 prevents the knife member 14 from premature engagement with the rupture disc. 11.

Located behind the hollow knife member 14 are the knife-actuating members in the form of a power spring 17 and a bellows motor 18. The power spring 17 is prevented from acting upon the knife member 14 by a manually removable power spring retainer 19. The bellows motor 18 is electrically activated by an external source (not shown) through the leads 20. The rear portion of the valve body is closed by a screwplug 21.

In operation, the deformed rupture disc 11 maintains a positive seal on a pressure or vacuum chamber connected to the valve body through the passageway 22. When it becomes necessary to activate the valve (as in a cockpit power failure in the chemiluminescent light source application) the knife member 14 is driven through the rupture disc 11 by either the power spring 17 or bellows motor 18. The force of the power spring 17 is delivered to the knife 14 by manual removal of the power spring retainer 19. Electrical activation is achieved by passing sufficient current through the leads 20 to cause the bellows motor 18 to expand and act upon the knife member 14.

When the knife member 14 is forced through the rupture disc 11, by either the power spring 17 or bellows motor 18, there is provided a fluid passageway through the hollow knife member 14 and valve body passageway 22 to the previously sealed chamber. The valve body may be connected to the external chamber by cementing or otherwise attaching a piece of tubing to the extension of the valve body 10 which forms the internal passageway 22.

A shown and described, the diaphragm valve of the present invention will maintain a leakproof seal for an indefinite period of time. It may be manually or electrically activated when needed with little worry of deterioration from disuse. Obviously, many modifications and variations are possible in light of the above teachings. It is therefore to be understood that, within the scope of the appended claims, the invention may be practiced otherwise than as specifically described.

I claim:

1. A diaphragm valve which comprises:
   a. a hollow body member having an internal chamber and a passageway;
   b. means within said internal chamber for positively sealing one end of the chamber from the passageway;
   c. a hollow knife member positioned within said internal chamber adjacent said sealing means;
   d. first and second independently operable actuating means for driving the hollow knife member through said sealing means to provide a fluid passageway from the chamber through the hollow knife member;
   e. said first independently operable actuating means comprising a power spring and a manually removable power spring retainer; and
   f. said second independently operable actuating means comprising an electrically activated bellows motor mounted in the hollow portion of said power spring; whereby the diaphragm valve may be activated manually by removal of the power spring retainer or electrically by passing a current through the bellows motor.

2. The diaphragm valve of claim 1 wherein the means for sealing comprises a rupture disc.

3. The diaphragm valve of claim 2 wherein the rupture disc is made of soft aluminum.

* * * * *